United States Patent
Roos

(10) Patent No.: US 9,667,127 B2
(45) Date of Patent: May 30, 2017

(54) METHOD AND APPARATUS FOR DETERMINING A ROTOR POSITION AND ROTATION SPEED OF AN ELECTRICAL MACHINE

(71) Applicant: Robert Bosch GmbH, Stuttgart (DE)

(72) Inventor: Gerald Roos, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/759,613

(22) PCT Filed: Jan. 2, 2014

(86) PCT No.: PCT/EP2014/050005
§ 371 (c)(1),
(2) Date: Jul. 7, 2015

(87) PCT Pub. No.: WO2014/108347
PCT Pub. Date: Jul. 17, 2014

(65) Prior Publication Data
US 2015/0349617 A1    Dec. 3, 2015

(30) Foreign Application Priority Data
Jan. 11, 2013    (DE) .................... 10 2013 200 314

(51) Int. Cl.
*H02K 23/04*    (2006.01)
*H02P 7/00*    (2016.01)
(Continued)

(52) U.S. Cl.
CPC ............. *H02K 23/04* (2013.01); *H02K 23/40* (2013.01); *H02P 7/0094* (2013.01); *H02K 23/66* (2013.01)

(58) Field of Classification Search
CPC ................................. H02K 23/04; H02P 7/00
(Continued)

(56) References Cited

U.S. PATENT DOCUMENTS

| 4,372,035 A | 2/1983 | McMillen |
| 7,986,065 B2 * | 7/2011 | Bhatti ...................... H02K 5/15 |
| | | 310/154.14 |

(Continued)

FOREIGN PATENT DOCUMENTS

| DE | 102008021071 | 11/2009 |
| DE | 102009046421 | 5/2011 |

(Continued)

OTHER PUBLICATIONS

Machine translation FR2910192.*
(Continued)

*Primary Examiner* — Kawing Chan
(74) *Attorney, Agent, or Firm* — Michael Best & Friedrich LLP

(57) ABSTRACT

The invention relates to a brush-commutated electrical machine. The machine includes a rotor with rotor coils which are arranged on rotor poles. The machine also includes a commutator with commutator laminations which are electrically connected to the rotor coils, and having two brushes which are arranged offset in relation to one another, with the result that the brushes alternately commutate when the rotor moves. The machine also includes a stator having stator poles which are arranged in the circumferential direction and at least some of which are provided with stator magnets, wherein the stator poles are designed and/or arranged such that an alternating stator magnetic field which is generated by said stator poles in the circumferential direction is formed differently depending on the pole direction of the respective stator pole.

17 Claims, 2 Drawing Sheets

(51) Int. Cl.
*H02K 23/40* (2006.01)
*H02K 23/66* (2006.01)

(58) Field of Classification Search
USPC .................. 318/400.32, 400.31, 400.01, 700
See application file for complete search history.

(56) References Cited

U.S. PATENT DOCUMENTS

| 8,288,907 B2 * | 10/2012 | Qin | ........................ | H02K 23/04 |
| | | | | 310/154.02 |
| 2010/0187937 A1 * | 7/2010 | Faber | ..................... | H02K 23/26 |
| | | | | 310/195 |

FOREIGN PATENT DOCUMENTS

| FR | 2910192 | 6/2008 |
| JP | 2009011051 | 1/2009 |
| JP | 2013005601 | 1/2013 |

OTHER PUBLICATIONS

Machine translation DE102008021071.*
International Search Report for Application No. PCT/EP2014/050005 dated Apr. 16, 2014 (English Translation, 3 pages).

* cited by examiner

METHOD AND APPARATUS FOR DETERMINING A ROTOR POSITION AND ROTATION SPEED OF AN ELECTRICAL MACHINE

BACKGROUND OF THE INVENTION

The present invention relates to brush-commutated electrical machines, in particular measures for ascertaining a rotor position or rotation speed of the electrical machine.

The use of brush-commutated electric motors as actuating motors for DC voltage applications is already known. For example, brush-commutated electric motors are used as drive motors for seat adjusters, window winders, sliding roof systems and the like in a motor vehicle. A common configuration is four- and six-pole DC actuating motors with permanent-magnet excitation comprising a commutator having two brushes.

During operation of electric motors of this kind, current ripple is produced on the supply line owing to the commutation processes. The current ripple corresponds to a periodic signal which is dependent on a rotation speed of the electric motor and of which the fundamental frequency depends on the number of commutator laminations. The current ripple can be used in sensor-free systems to detect the motor rotation speed and the rotor position.

Depending on the number of poles of the electric motor and the number of commutator laminations of the commutator, a particularly high current ripple results in the event of simultaneous commutation of the brushes, the main order (fundamental frequency) of said current ripple being given by the number of commutator laminations and the actual rotation speed of the electric motor. As an alternative, the brushes can also be arranged such that they commutate in an offset manner, as a result of which a more weakly pronounced current ripple is produced, the main order of said current ripple corresponding to a multiple of the number of the commutator laminations, generally to twice the main order, given an offset of the brushes by n+½ commutator laminations. In this case there is virtually no detectable current ripple in the order which is prespecified by the number of commutator laminations.

In order to keep electromagnetic force excitations and the associated noise emissions low, it is advantageous to select the number of commutator laminations and the number of rotor poles such that the brushes commutate alternately. On account of the low current ripple, in particular in the order of the number of commutator laminations, said brushes are not suitable for operation on controllers which use the current ripple to detect the rotation speed of the electric motor and/or the rotor position.

SUMMARY OF THE INVENTION

The object of the present invention is to provide a method and an apparatus with which the rotation speed and/or the rotor position of an electric motor can be detected in an improved manner with brushes which commutate in an offset manner.

A brush-commutated electrical machine comprising:
  a rotor having rotor coils which are arranged on rotor poles;
  a commutator having commutator laminations which are electrically connected to the rotor coils, and having two brushes which are arranged offset in relation to one another, so that the brushes alternately commutate when the rotor moves;
  a stator having stator poles which are arranged in the circumferential direction and at least some of which are provided with stator magnets,
wherein the stator poles are designed and/or arranged in such a way that an alternating stator magnetic field which is generated by said stator poles in the circumferential direction is formed differently depending on the pole direction of the respective stator pole is provided according to a first aspect.

One idea of the above method is to form the stator poles differently in a brush-commutated electrical machine, in particular an electric motor, with brushes which commutate in an offset manner, so that said brushes alternately produce different magnetic fields. The magnetic fields can differ in respect of shape, extent and strength.

This results in the main order of the current ripple, which main order is generally suppressed by the brushes which commutate in an offset manner, being suppressed to a lesser extent at the frequency which is determined by the number of commutator laminations and the actual rotation speed. In this way, a proportion of the current ripple with a frequency of the main order remains in the frequency range determined by the number of commutator laminations, so that it remains suitable for evaluation in respect of a rotation speed and/or a rotor position. In this way, the rotation speed and/or the rotor position of electric motors can be detected using conventional motor controllers, without it being necessary to dispense with the advantages provided by the commutation with offset brushes.

The non-uniform design of the stator poles in particular leads to the induced voltages in the rotor coils which commutate at the positive and negative brushes being different. The current profiles at the positive and negative brushes are likewise different as a result and the phase-offset superimposition of the current profiles which is caused by the alternating commutation therefore leads to reduced weakening of the current ripple in the main order of the frequency which is determined by the number of commutator laminations.

Furthermore, the stator magnets can be arranged in a consequent-pole arrangement, wherein a passive stator pole, which is not formed with a magnet, is provided between in each case two adjacent stator magnets, said stator pole being coupled to a return path region of the stator.

As an alternative or in addition, the stator magnets can be formed with different magnetic field strengths depending on the polarity direction of the associated stator pole.

Furthermore, the stator poles can be formed with different tangential widths depending on the polarity direction of said stator poles.

According to one embodiment, the stator poles which are adjacent in the circumferential direction can have pole directions which are opposite one another.

Furthermore, the brushes can be arranged in relation to the commutator laminations with an offset in the circumferential direction of n+½ tangential widths of one of the commutator laminations, wherein n corresponds to an integer.

A motor system comprising the above electrical machine and comprising a controller is provided according to a further aspect, said motor system being designed to determine a rotor position and/or a rotation speed by evaluating a current ripple of a motor current flowing through the electrical machine.

BRIEF DESCRIPTION OF THE DRAWINGS

Preferred embodiments of the present invention will be explained in greater detail below with reference to the appended drawings, in which.

DETAILED DESCRIPTION

Figure 1:
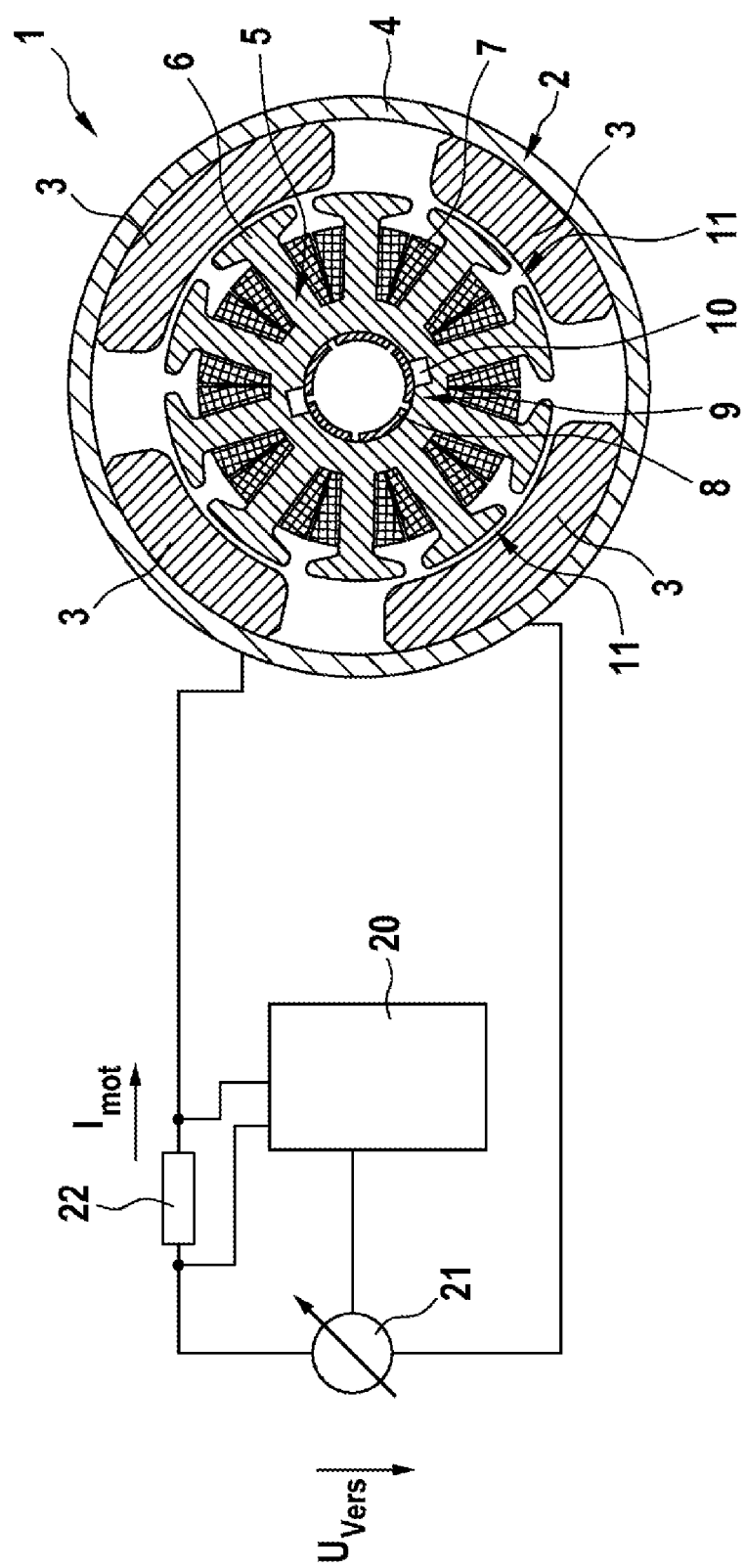
FIG. 1 shows a schematic illustration of a motor system comprising a motor controller and an electric motor.

FIG. 1 shows a schematic illustration of a motor system 1 comprising an electric motor 2 as electrical machine. The electric motor 2 is a brush-commutated DC motor comprising a stator 4, which is provided with one or more permanent magnets 3, and a rotor 5 which is rotatably mounted in an interior of the stator 4.

The stator 4 is formed with stator poles 11 which produce a stator magnetic field, which is produced by the permanent magnets 3 (stator magnets), in the interior of the stator 4, said stator magnetic field alternating along a circumferential direction. In the present exemplary embodiment, the electric motor 2 is formed with four stator poles 11. Alternative embodiments can also provide more than four stator poles 11, such as six stator poles for example.

In the illustrated exemplary embodiment, the rotor 5 has ten rotor poles 6 (rotor teeth) which are each surrounded by a rotor coil 7. The rotor coils 7 are each electrically connected to two commutator laminations 8 of a commutator 9. With the aid of brushes 10 which are arranged on the commutator 9, electrical contact is made with the commutator laminations 8 and, as a result, the rotor coils 7 and a supply voltage $U_{Vers}$ is applied to said commutator laminations and rotor coils.

The brushes 10 are arranged such that the rotor coils are alternately commutated by means of the commutator laminations 8 when the rotor 5 rotates, that is to say as a first of the brushes 10 passes across a commutator lamination 8, a second of the brushes 10 changes from a further of the commutator laminations 8 to an adjacent commutator lamination. In other words, the distance along the circumferential direction of the commutator 9 between the two brushes 10 is (n+½) commutator laminations. By way of example, in an embodiment with ten rotor coils 7, said rotor coils are connected to ten commutator laminations 8, wherein the brushes are then, in particular, arranged at approximately 90° in relation to one another when n=2.

The electric motor 2 is operated with the aid of a controller 20 which can specify the level of the supply voltage $U_{Vers}$ with the aid of an adjustable voltage source 21. In particular, the rotation speed and/or the load of the electric motor 2 can be set by prespecifying the supply voltage $U_{Vers}$. As an alternative, a battery voltage is applied, for example, in the motor vehicle, said battery voltage being subject to certain fluctuations, in particular owing to particular environmental conditions. Furthermore, a motor current $I_{mot}$ in the electric motor 2 can be detected with the aid of a measurement resistor 22, and an evaluation electronics system can detect the rotation angle of the rotor 5 from the ripple of the motor current signal, and generate a rotation speed or position signal of the rotor, or of the part which is to be adjusted, from said rotation angle. This can be used, for example, to implement a trapping-prevention function when closing a moving part in the motor vehicle—in particular in the case of a window winder or sliding roof—, said trapping-prevention function preferably being arranged in the motor controller 20. It goes without saying that other apparatuses for detecting the motor current $I_{mot}$ are also feasible.

In one embodiment, provision can be made, for example, for the motor controller 20 to set the supply voltage $U_{Vers}$ depending on a detected rotation speed of the electric motor 2, for example in order to carry out rotation speed control. This can be implemented by pulse-width modulation (PWM).

In order to save on a rotation speed sensor, the rotation speed is often detected from a current ripple of the motor current $I_{mot}$. During commutation of the rotor coils 7 by the brushes 10, the current ripple is produced on account of a movement of the rotor coil 7 by the magnetic field which is produced by the permanent magnet 3. The frequency of the main order of the current ripple of the motor current $I_{mot}$ is determined directly from the rotation speed and the number of commutator laminations, wherein, owing to the offset arrangement of the brushes 10, the frequency of the main order corresponds to double a frequency of a main order when brushes 10 are not offset. The increased frequency which is produced by the offset arrangement of the brushes 10 in respect of the commutator laminations and the reduced amplitude of the current ripple is more difficult to detect by the motor controller 20.

In order to increase the current ripple in the main order, provision is now made for the stator poles to be designed so differently that they provide magnetic fields with different magnetic field strengths. In particular, the magnetic field strength of adjacent stator poles can be alternately corrected to a lesser and greater extent.

This can be achieved for the exemplary embodiment of FIG. 1 in that the permanent magnets 3 are formed with different tangential widths, so that a relatively tangentially broad permanent magnet 3 and a relatively tangentially narrow permanent magnet 3 are alternately arranged in the circumferential direction.

Figure 2A:
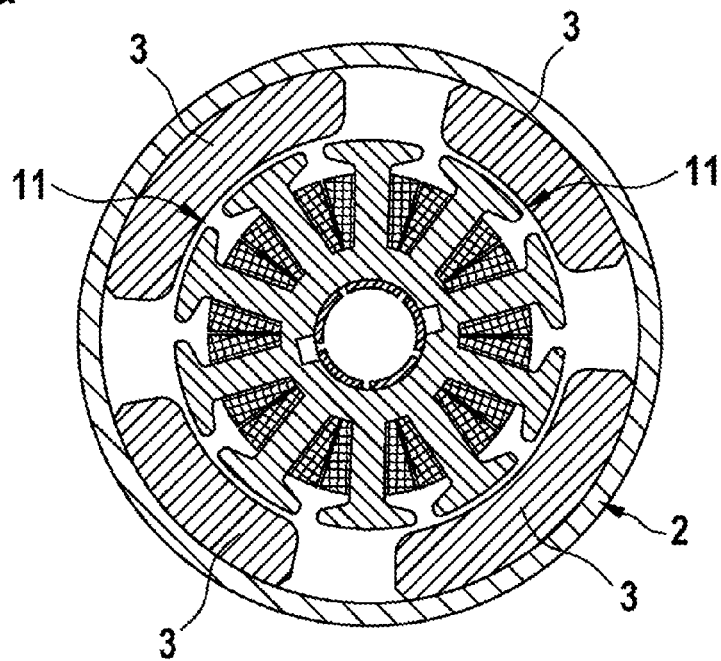
FIGS. 2a and 2b show possible ways of providing stator poles for generating a different stator magnetic field which is dependent on the polarity direction.

Furthermore, as an alternative or in addition, the permanent magnets 3 can be formed with different magnetizations or different magnetic material. In particular, given the same tangential dimensions, the permanent magnets 3, which are aligned with the south pole in relation to the rotor 5, can be provided with a stronger magnetization than the permanent magnets 3 which are aligned with the north pole in relation to the rotor 5, or vice versa. A corresponding electric motor is illustrated in FIG. 2a.

Figure 2B:
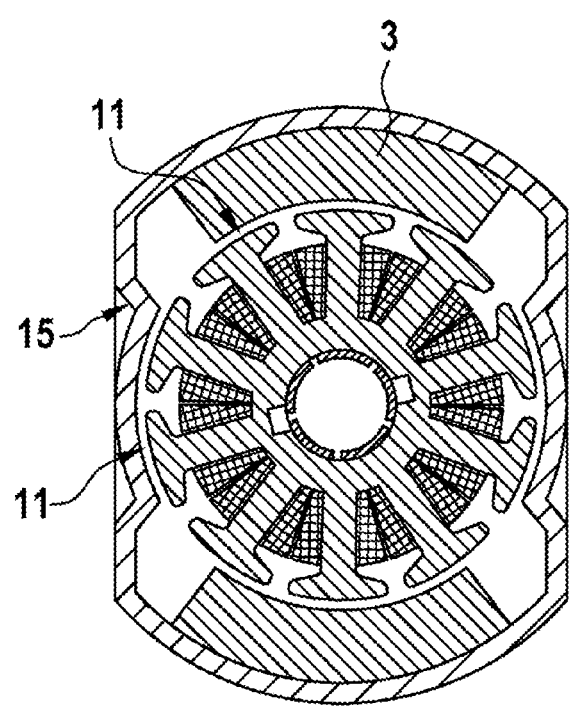

According to the arrangement illustrated in FIG. 2b, this can also be achieved by a consequent-pole arrangement of the stator poles 11. In a consequent-pole arrangement, only every second stator pole 11 is provided with a permanent magnet 3, and the stator poles 11 which are in each case situated therebetween are formed as consequent poles 15 by a passive pole shoe. The consequent poles 15 are formed from a magnetically permeable material and are magnetically permeably connected to a return path region of the stator 4. In particular, the consequent poles 15 can be integrally formed with the return path region of the stator 4. To this end, passive pole shoes are formed from the wall material of the pole pot for example, said pole shoes being of curved design in particular.

The consequent poles 15 are preferably designed such that the stator magnetic field produced by them in the direction of the rotor 5 has a different magnetic field strength to the stator poles 11 which are formed by the permanent magnets 3.

The invention claimed is:

1. A brush-commutated electrical machine, comprising:
   a rotor having rotor coils which are arranged on rotor poles;
   a commutator having
      commutator laminations which are electrically connected to the rotor coils, and two brushes which are arranged offset in relation to one another, so that the brushes alternately commutate when the rotor moves;

a stator having stator poles which are arranged in the circumferential direction and at least some of which are provided with stator magnets, wherein the stator poles are configured so that a stator magnetic field which is generated by said stator poles is formed differently depending on the different pole direction of the respective stator pole, and the stator poles have different magnetic field strengths as a result of at least one selected from the group of i) being formed from different magnetic materials, ii) having different physical geometries, and iii) having different initial magnetizations.

2. The electrical machine as claimed in claim 1, wherein the stator magnets are arranged in a consequent-pole arrangement, wherein a passive stator pole, which is not formed with a permanent magnet, is provided between in each case two adjacent stator magnets as a consequent pole which is coupled to a return path region of the stator, wherein the consequent pole is formed from a wall region of a magnetically permeable pole pot.

3. The electrical machine as claimed in claim 1, wherein the stator poles have a different physical geometry depending on the polarity direction of said stator poles, wherein the different physical geometry is formed with different tangential widths in relation to the rotor axis.

4. The electrical machine as claimed in claim 3, wherein the stator poles include a first stator pole and a second stator pole adjacent to the first stator pole, and wherein a tangential width of the first stator pole is different than a tangential width of the second stator pole.

5. The electrical machine as claimed in claim 1, wherein the stator poles which are adjacent in the circumferential direction have an opposite pole direction to one another.

6. The electrical machine as claimed in claim 1, wherein the brushes are arranged with an offset in the circumferential direction of n+½ tangential widths of one of the commutator laminations, where n corresponds to an integer.

7. The electrical machine as claimed in claim 1, wherein the stator poles are formed with the same physical geometries, and wherein a first stator pole is formed with a first magnetic material and a second stator pole is formed with a second magnetic material different from the first magnetic material, wherein the first magnetic material provides a stronger magnetic field than the second magnetic material.

8. The electrical machine as claimed in claim 1, wherein the stator poles are formed with the same physical geometries, and wherein a first stator pole is formed with a first initial magnetization and a second stator pole is formed with a second initial magnetization, wherein the first initial magnetization is stronger than the second initial magnetization.

9. A motor system comprising:
a brush-commutated electrical machine, the brush-commutated electrical machine including
a rotor having rotor coils which are arranged on rotor poles,
a commutator having commutator laminations which are electrically connected to the rotor coils, and two brushes which are arranged offset in relation to one another, so that the brushes alternately commutate when the rotor moves, and
a stator having stator poles which are arranged in the circumferential direction and at least some of which are provided with stator magnets, wherein the stator poles have different magnetic field strengths as a result of at least one selected from the group of i) being formed from different magnetic materials, ii) having different physical geometries, and iii) having different initial magnetizations, and wherein the stator poles are configured so that a stator magnetic field which is generated by said stator poles is formed differently depending on the different pole direction of the respective stator pole; and
a controller configured to determine a rotor position and a rotation speed by evaluating a current ripple of a motor current flowing through the electrical machine.

10. The motor system of claim 9, wherein the voltage which is induced in the coils between the negative and the positive brush is different when interacting with the different stator magnets.

11. The motor system of claim 9, wherein the generated motor current in the rotor coils between the negative and the positive brush is different when interacting with the different stator magnets, and as a result a phase-offset superimposition of the generated motor current in the rotor coils which is caused by the alternating commutation no longer reduces the current ripple in the order of the number of commutator laminations to such an extent as is the case with identical stator magnets.

12. The motor system of claim 9, wherein, in the event of interaction of the rotor coils with the different stator magnets over the corresponding angular range of the stator magnets, the current ripple of the motor current which is generated and measured during commutation has a different maximum amplitude, the amplitude of the current ripple does not change in a periodically uniform manner over a complete rotation of the rotor, or the current ripple of the motor current which is generated and measured during commutation has a different maximum amplitude and the amplitude of the current ripple does not change in a periodically uniform manner over a complete rotation of the rotor.

13. The motor system as claimed in claim 9, wherein the stator poles have a different physical geometry depending on the polarity direction of said stator poles, wherein the different physical geometry is formed with different tangential widths in relation to the rotor axis.

14. The motor system as claimed in claim 13, wherein the stator poles include a first stator pole and a second stator pole adjacent to the first stator pole, and wherein a tangential width of the first stator pole is different than a tangential width of the second stator pole.

15. The motor system as claimed in claim 9, wherein the stator poles are arranged in a consequent-pole arrangement, wherein a passive stator pole, which is not formed with a permanent magnet, is provided between in each case two adjacent stator magnets as a consequent pole which is coupled to a return path region of the stator, wherein the consequent pole is formed from a wall region of a magnetically permeable pole pot.

16. The motor system as claimed in claim 9, wherein the stator poles are formed with the same physical geometries, and wherein a first stator pole is formed with a first magnetic material and a second stator pole is formed with a second magnetic material different from the first magnetic material, wherein the first magnetic material provides a stronger magnetic field than the second magnetic material.

17. The electrical machine as claimed in claim 9, wherein the stator poles are formed with the same physical geometries, and wherein a first stator pole is formed with a first initial magnetization and a second stator pole is formed with a second initial magnetization, wherein the first initial magnetization is stronger than the second initial magnetization.

\* \* \* \* \*